(No Model.)

F. TRUMP.
CONNECTING ROD BEARING.

No. 301,536. Patented July 8, 1884.

Attest:
Court A Cooper
Wm J Sayers

Inventor:
Fuller Trump
By Foster & Freeman
Atty

UNITED STATES PATENT OFFICE.

FULLER TRUMP, OF SPRINGFIELD, OHIO.

CONNECTING-ROD BEARING.

SPECIFICATION forming part of Letters Patent No. 301,536, dated July 8, 1884.

Application filed May 22, 1884. (No model.)

*To all whom it may concern:*

Be it known that I, FULLER TRUMP, a citizen of the United States, residing at Springfield, in the county of Clark and State of Ohio, have invented certain new and useful Improvements in Connecting-Rod Bearings, of which the following is a specification.

My invention is a device constructed, as fully described hereinafter, so as to secure a firm but flexible connection between the end of a connecting-rod and its support, and at the same time prevent lateral play and lost motion, and permit the parts to be held securely in position and tightened, as desired.

Figure 1:
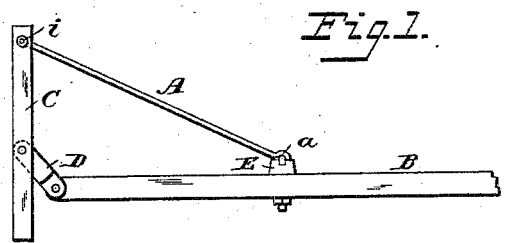
Figure 4:
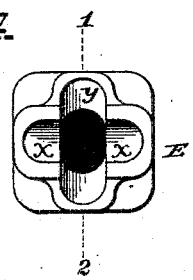
Figure 5:
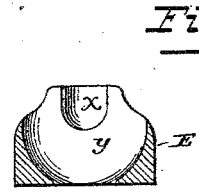
Figure 3:
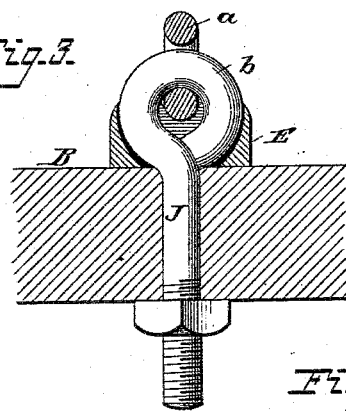
Figure 2:
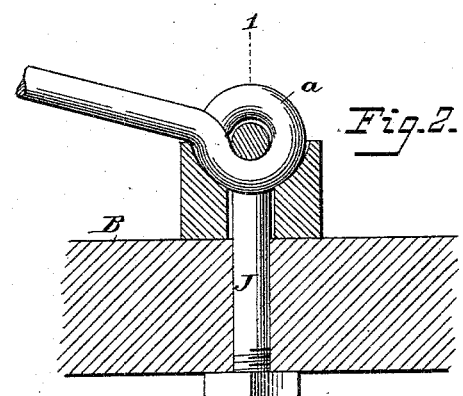
Figure 6:
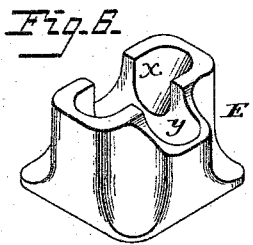
Figure 7:
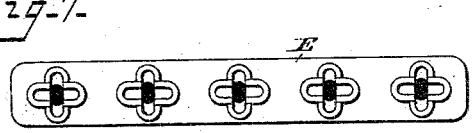

In the drawings, Figure 1 is a view showing a connecting-rod attached to an oscillating shaft and secured at the inner end in accordance with my improvement. Fig. 2 is a section through the bearing-block and support. Fig. 3 is a section on the line 1 2, Fig. 2. Fig. 4 is a plan of the bearing-block. Fig. 5 is a section on the line 1 2, Fig. 4. Fig. 6 is a perspective view of the bearing-block. Fig. 7 is a modification.

It is common in many classes of machinery to joint the ends of connecting-rods to the permanent or stationary supports, either by means of an eyebolt upon said support and an eye upon the end of the connecting-rod, or by having parallel lips or lugs upon the support with a cross-pin passing through the eye at the end of the connecting-rod. In either case there is considerable lost motion, much wear, and the connecting-rod has no support laterally, and consequently is allowed a free lateral play.

My invention is a bearing and joint for the end of the connecting-rod, whereby I prevent the lost motion and secure a desirable lateral support. The improved bearing may be used in connection with any class of machinery in which a rod, A, must be jointed so as to swing freely about a point or connection upon a fixed support, B. I have shown in Fig. 1 the arrangement of the rod and its bearing in relation to an arm or shaft, C, carried by the pin of a crank, D, and adapted to carry at the lower end a fork, blade, crushing-head, or other device. The rod A has an eye at each end, the outer eye receiving a pin, $i$, extending across the shaft C, and the inner end having also an eye, $a$, formed by bending the end of the rod into a ring. At the point where the inner end of the rod is to be joined to the support B is a bearing, E, consisting of a metallic block having a curved socket, $x$, in line with the rod A, and adapted to receive the eye $a$, and to permit it to rock therein, while at the same time preventing to a very great extent any lateral motion. The bearing E is also provided with a slot, $y$, extending transversely through the socket $x$, and completely through the bearing-block, and in this slot lies the ring or hook shaped eye $b$ at the head of an eyebolt, J, the shank of which extends downward through the support B, and is provided with a nut, whereby the bolt may be drawn downward. The eyes $a$ and $b$ are interlocked, as shown in Figs. 2 and 3, so that the eyebolt holds the eye $a$ in its socket, and at the same time holds the bearing-block E in its place upon the support B.

It will be seen that the connection above described may be effected at any point upon the support by perforating the latter at such point for the passage of the shank of the bolt J that the connecting-rod may play freely upon the eye $b$ and in the socket $x$ with little if any lost or lateral motion, and that there is much less wear than results where the connecting-rod plays freely upon the attachment, as usual. It will also be seen that the bearing-block E may be cast cheaply, and by being made of any desired depth permits the joint to be elevated to any desired extent above the surface of the support B.

It will be apparent that the external form of the block E may be of any desired shape, and that a bearing may be made by combining in one piece or by forming a series of sockets and transverse recesses in one piece or strip of metal, thus avoiding the necessity of securing a number of separate blocks side by side. Such an arrangement is illustrated in Fig. 7.

Without limiting myself to the precise construction and arrangement of parts shown, I claim—

1. A bearing for connecting-rods, consisting of a block provided with a rounded socket adapted to receive the eye at the end of the connecting-rod, and with a transverse slot adapted to receive the eye at the end of an eyebolt, interlocked with the eye of the connecting-rod, substantially as set forth.

2. The bearing-block E, provided with a cross-slot, $y$, and with a socket, $x$, extending transversely across the said slot at the upper end of said slot, substantially as set forth.

In testimony whereof I have signed my name to this specification in the presence of two subscribing witnesses.

FULLER TRUMP.

Witnesses:
F. L. FREEMAN,
L. C. YOUNG.